(12) United States Patent
Cutkosky et al.

(10) Patent No.: US 7,762,362 B2
(45) Date of Patent: Jul. 27, 2010

(54) CLIMBING WITH DRY ADHESIVES

(75) Inventors: Mark R. Cutkosky, Palo Alto, CA (US); Sangbae Kim, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 93 days.

(21) Appl. No.: 11/732,867

(22) Filed: Apr. 4, 2007

(65) Prior Publication Data

US 2007/0289786 A1    Dec. 20, 2007

Related U.S. Application Data

(60) Provisional application No. 60/792,761, filed on Apr. 17, 2006.

(51) Int. Cl.
*B62D 51/06* (2006.01)
(52) U.S. Cl. ............... 180/8.5; 180/8.1; 180/8.6
(58) Field of Classification Search .......... 180/8.1, 180/8.5, 8.6
See application file for complete search history.

(56) References Cited

U.S. PATENT DOCUMENTS

| | | | | |
|---|---|---|---|---|
| 269,614 | A * | 12/1882 | Adams ................ | 180/8.1 |
| 1,704,866 | A * | 3/1929 | Morgan ................ | 299/10 |
| 3,693,740 | A * | 9/1972 | Lewis et al. ........... | 180/8.1 |
| 4,477,998 | A | 10/1984 | You | |
| 4,674,949 | A | 6/1987 | Kroczynski | |
| 4,764,148 | A | 8/1988 | Wong | |
| 4,884,989 | A | 12/1989 | Wong | |
| 4,971,591 | A | 11/1990 | Raviv et al. | |
| 5,257,669 | A | 11/1993 | Kerley et al. | |
| 5,346,027 | A * | 9/1994 | Da et al. ................ | 180/8.2 |
| 5,392,498 | A * | 2/1995 | Goulait et al. .......... | 24/452 |
| 5,455,497 | A * | 10/1995 | Hirose et al. .......... | 318/568.12 |
| 5,551,525 | A | 9/1996 | Pack et al. | |
| 5,809,099 | A | 9/1998 | Kim et al. | |
| 5,839,532 | A | 11/1998 | Yoshiji et al. | |
| 5,916,008 | A | 6/1999 | Wong | |
| 6,377,014 | B1 * | 4/2002 | Gomi et al. .......... | 318/568.12 |
| 6,737,160 | B1 * | 5/2004 | Full et al. ............. | 428/397 |
| 6,872,439 | B2 | 3/2005 | Fearing et al. | |
| 7,011,723 | B2 | 3/2006 | Full et al. | |
| 7,554,787 | B2 * | 6/2009 | Pelrine et al. ......... | 361/234 |
| 2003/0124312 | A1 * | 7/2003 | Autumn ............... | 428/141 |
| 2005/0011685 | A1 * | 1/2005 | Takenaka et al. ....... | 180/8.6 |
| 2005/0181170 | A1 | 8/2005 | Fearing et al. | |
| 2006/0005362 | A1 | 1/2006 | Arzt et al. | |

* cited by examiner

*Primary Examiner*—Lesley Morris
*Assistant Examiner*—Maurice Williams
(74) *Attorney, Agent, or Firm*—Lumen Patent Firm (57) ABSTRACT

A bio-inspired device is provided designed to scale smooth vertical surfaces using anisotropic frictional materials. The device draws its inspiration from geckos and other climbing lizards and employs similar compliance and force control strategies to climb (or hang onto) smooth vertical surfaces including glass, tile and plastic panels. Foremost among the design features embodied in the device are multiple levels of compliance, at length scales ranging from centimeters to micrometers, to allow the device to conform to surfaces and maintain large real areas of contact so that adhesive forces can support it. Structures within the feet ensure even stress distributions over each toe and facilitate engagement and disengagement of the adhesive materials. A force control strategy works in conjunction with the anisotropic adhesive materials to obtain sufficient levels of friction and adhesion for climbing with low attachment and detachment forces.

31 Claims, 7 Drawing Sheets

Side view of Toe

Side view of Toe

Figure 2A

Push-pull cable actuator

Differential system

Figure 2B

Rocker bogie

Figure 7

CLIMBING WITH DRY ADHESIVES

CROSS-REFERENCE TO RELATED APPLICATIONS

This application is cross-referenced to and claims priority from U.S. Provisional Application 60/792,761 filed Apr. 17, 2006, which is hereby incorporated by reference.

FEDERALLY-SPONSORED RESEARCH OR DEVELOPMENT

This invention was made with Government support under contract N66001-03-C-8045 awarded by the Space and Naval Warfare Systems Center. The Government has certain rights in this invention.

FIELD OF THE INVENTION

The invention generally relates to climbing robots. In particular, the invention relates to directional and distributed control of adhesive forces for a climbing robot.

BACKGROUND OF THE INVENTION

Robots capable of climbing vertical surfaces would be useful for disaster relief, surveillance, and maintenance applications. Various robots have used suction and magnets for climbing smooth surfaces. A controlled vortex that creates negative aerodynamic lift has also been demonstrated. However, these solutions require substantial power and generate noise even when stationary. Microspines, drawing inspiration from insects and spiders, have been used to climb rough surfaces such as brick and concrete.

For climbing on a range of vertical surfaces from smooth glass to rough stucco, various animals including insects, spiders, tree frogs and geckos employ wet or dry adhesion. The impressive climbing performance of these creatures has lead to a number of robots that employ adhesives for climbing. Sticky adhesives have the disadvantage that they quickly become dirty and lose adhesion. Another disadvantage is that the adhesive requires relatively high forces for attachment and detachment. Some researchers have circumvented this problem by using spoke-wheel designs that allow the detachment forces at a receding point of contact to provide the necessary attachment force at the next.

To overcome the problems with sticky adhesives, there has been a trend toward developing dry adhesives, which generally have a higher elastic modulus than pressure sensitive adhesives (PSAs) and rely on van der Waals forces between arrays of microscopic features and the substrate for adhesion. These have been modeled on the adhesive properties of geckos. In other work, climbing robots have used elastomeric microstructured tape or elastomeric pads that attract dirt after repeated use but, in contrast to PSAs, can be cleaned with water and reused. As feature sizes grow smaller, increasingly stiff and hydrophobic materials can be used while still obtaining sufficient real areas of contact for van der Waals forces to provide useful levels of adhesion. The result is an adhesive that resists dirt accumulation.

Currently, no single solution generates high adhesion, attaches with low preload, is rugged, self-cleaning, and can be scaled to climbing robot applications. The present invention addresses these shortcomings and advances the art of climbing robots and its applications thereof. In particular, the present invention provides new design mechanisms that are essential for a legged robot to climb and maneuver on vertical surfaces using dry adhesion. These design mechanisms enable: (i) hierarchical compliance for conforming at centimeter, millimeter, and micrometer scales; (ii) 2) directional adhesives so that the robot can control adhesion by controlling shear; and (iii) distributed force control that works with compliance and anisotropy to achieve stability.

SUMMARY OF THE INVENTION

The present invention entails a climbing robot using directional and distributed control of adhesive forces. The climbing robot has multiple limbs each with a plurality of toes. Each toe contains a plurality of parallel anisotropic hair features. These hair features make an acute angle with respect to a reference plane to define a hair direction. In one example the acute angle, $\phi_1$, ranges from $45 < \phi_1 < 90$ degrees. In another example the acute angle is about 70 degrees. Each of the anisotropic hair features have a tip angle with respect to the reference plane and with the hair tip in the direction of the hair direction. In one example the tip angle, $\phi_2$, ranges from $0 < \phi_2 < \phi_1$ degrees. In another example the tip angle is about 45 degrees.

A backing layer with embedded therein a flexible and inextensible fiber is affixed to the plurality of parallel anisotropic hair features. In one example, the backing layer varies in height. In another example the backing layer increases height in a direction opposite to the hair direction. The flexible and inextensible fiber is for example a fiber mesh, a fabric, a synthetic fiber or a synthetic cloth fiber.

A plurality of segments is affixed to the backing layer on the side of the backing layer opposite to the hair features. In one example, the segment thickness varies in height. In another example the segment thickness increases height in a direction opposite to the hair direction. The material of the backing layer is softer than the material of segments.

A cable goes through and near the surface of the plurality of segments. This cable controls the toes through an actuator. In one example the actuator is a push-pull actuator and push-pulls the cable. When the actuator controls the cable and herewith the toes, the backing layer hinges at gaps between the segments.

The design and control mechanisms of this invention provide several advantages over prior solutions. For example, the design features embodied in the climbing robot are multiple levels of compliance, at length scales ranging from centimeters to micrometers, to allow the robot to conform to surfaces and maintain large real areas of contact so that adhesive forces can support it. Structures within the feet ensure even stress distributions over each toe and facilitate engagement and disengagement of the adhesive materials. A force control strategy works in conjunction with the anisotropic adhesive materials to obtain sufficient levels of friction and adhesion for climbing with low attachment and detachment forces.

The invention could be a device or a system useful in non-robotic applications such as hanging or suspending objects on inclined, vertical or non-horizontal surfaces. For example, the features of the present invention could be combined as a device or system to create a hanging device, a picture hanger, a suspension mechanism, a finger, a robot finger, a toe or a robot toe.

BRIEF DESCRIPTION OF THE FIGURES

The present invention together with its objectives and advantages will be understood by reading the following description in conjunction with the drawings, in which:

FIGS. 2A-B shows according to the present invention a two-stage differential system actuated by a single push-pull actuator (FIG. 2A), which facilitates conformation on uneven surfaces and distributes the contact forces among the four toes.

FIGS. 3A-B shows according to the present invention details of the nomenclature used to calculate the cable profile of the toes (FIG. 3B).

FIG. 5 shows according to the present invention a comparison of the frictional-adhesion model (See Autumn et al. (2006) in a paper entitled "Frictional adhesion: a new angle on gecko attachment" and published in J. Exp. Biol. 209(18): 3569-3579) and the Johnson-Kendall-Roberts (JKR) model (See Johnson et al. (1971) in a paper entitled "Surface energy and the contact of elastic solids" and published in the Proceedings of the Royal Society A: Mathematical, Physical and Engineering Sciences, 324(1558): 301-313) with pull off force data from a single toe of Stickybot's anisotropic patches (513 stalks). (A) When dragged against the preferred direction, the anisotropic patch exhibits negligible adhesion, although it sustains greater tangential force than would be expected from Coulomb friction when the normal force is zero. (B) When dragged in the preferred direction, the anisotropic patch demonstrates adhesion proportional to the shear force, albeit with saturation at the highest levels (unlike gecko setae). (C) The frictional-adhesion model has an upper shear force limit. In comparison, the JKR model shows the typical behavior of an isotropic elastic material with adhesion.

DETAILED DESCRIPTION OF THE INVENTION

A. Hierarchical Compliance

Climbing with van der Waals forces requires intimate contact because the forces scale as $A/d^3$ where A is the Hammacher constant and d is the local separation between two surfaces. For particular material combinations the Hammacher constant can vary by as much as a factor of 4. However, reducing the separation distance has a much greater effect, making it essential to comply to surfaces at all length scales above tens of nanometers.

Natural materials, and many man-made materials such as concrete, have an approximately fractal surface topography. As a result, surface features such as protrusions or indentations can be found at many length scales, from centimeters to fractions of micrometers. Consequently, a general-purpose solution for dry adhesion must involve conformability over similar length scales.

In the gecko, the flex of the body and limbs allows for conformation at the centimeter scale. The feet are divided into several toes that can conform independently at a scale of several millimeters. The bottom surfaces of toes are covered with lamellae that conform at the millimeter scale. The lamellae are composed of many individual setae, each of which acts as a spring-loaded beam that provides conformability at the 1-50 micrometer scale. The tips of the setae are divided into hundreds of spatulae that provide conformability at the <500 nanometer scale. The consequence of the gecko's hierarchical system of compliances is that it can achieve levels of adhesion of over 500 KPa on a wide variety of surfaces from glass to rough rock and can support its entire weight from just one toe.

To enable a climbing robot to climb a variety of surfaces from glass to corrugated siding an analogous, albeit much less sophisticated, hierarchy of compliances has been employed and provided herein. In one example, the body of Stickybot is a highly compliant under-actuated system comprised of 12 servos and 38 degrees of freedom. The torso and limbs were created via Shape Deposition Manufacturing using two different grades of polyurethane (Innovative Polymers: 72 Shore-DC and 20 Shore-A hardness).

The stiffest and strongest components of Stickybot are the upper and lower torso and the forelimbs, which are reinforced with carbon fiber. The central part of the body represents a compromise between sufficient compliance to conform to gently curved surfaces and sufficient stiffness so that maximum normal forces of approximately +/−1N can be applied at the feet without producing excessive body torsion. Additionally, the spine structure at the center of body has the ability to provide body articulation for greater maneuverability.

Figure 1A:
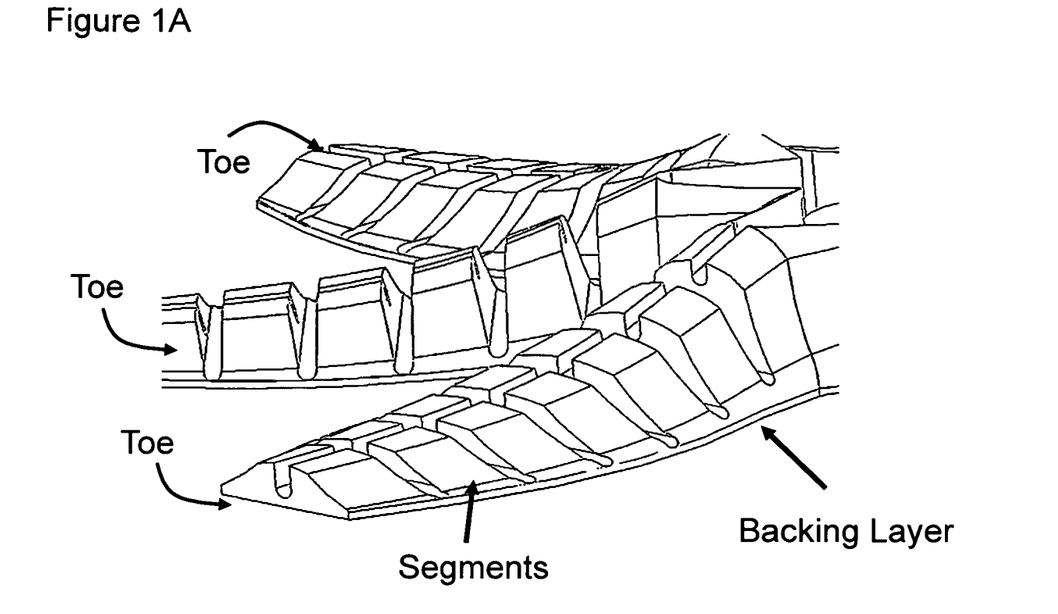
FIGS. 1A-B shows according to the present invention a three-dimensional schematic of the toes (FIG. 1A) and a schematic cross section view of a toe of Stickybot (FIG. 1B).
Figure 1B:
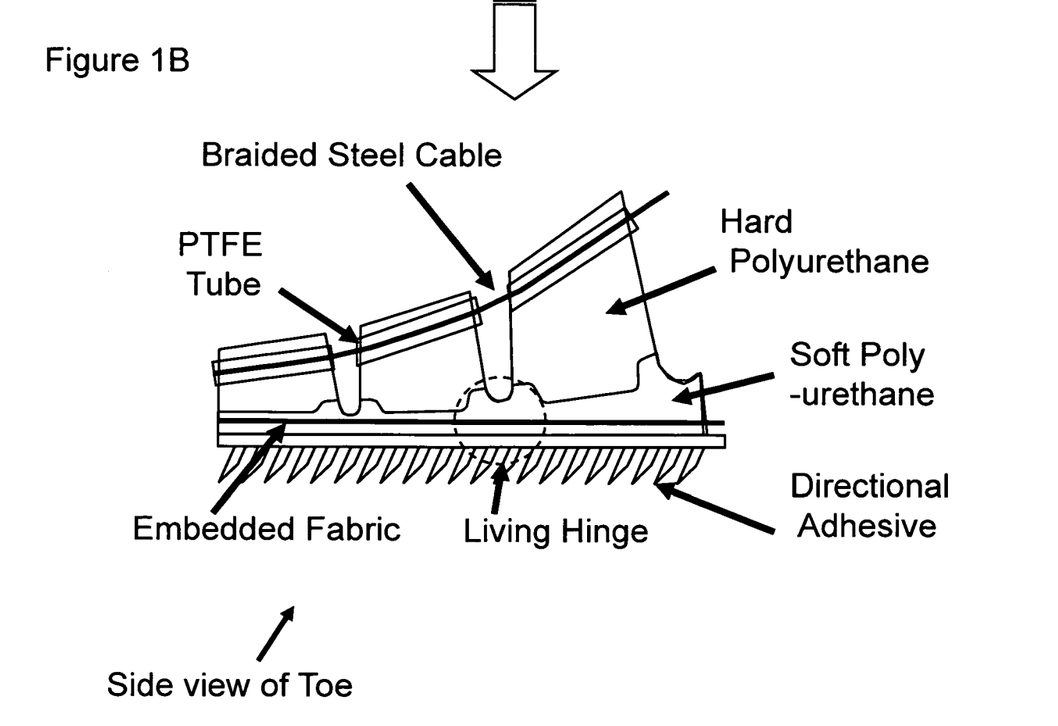
Figure 2A:
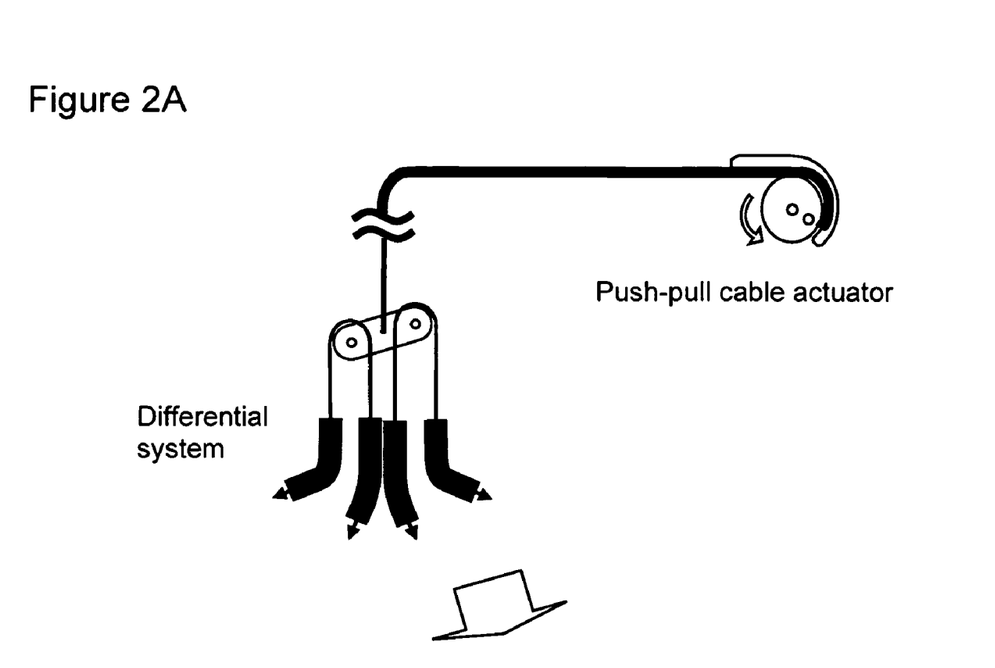
Figure 2B:
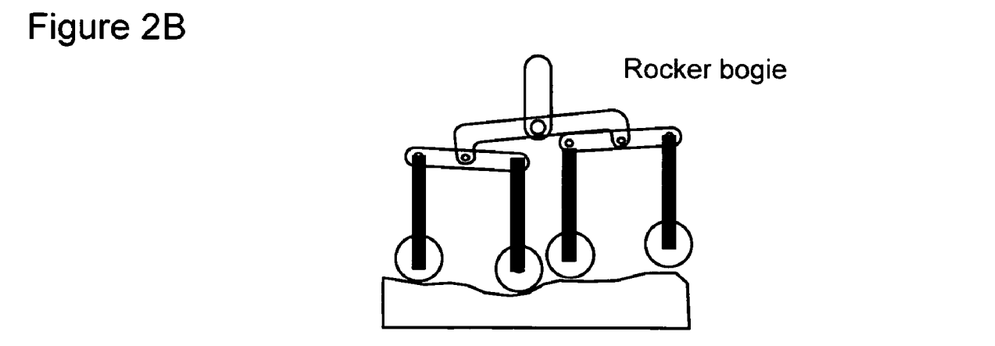
FIG. 2B shows an example of how the single servomotor actuates the toes using a double-rocker linkage "bogie".

In this example, each limb of Stickybot is equipped with four segmented toes. Each toe has two grades of polyurethane and reinforced with embedded synthetic cloth fiber or fiber mesh, which is flexible but inextensible (FIGS. 1A-B). A single servomotor actuates the toes using a double-rocker linkage and cables in (metal) sleeves (FIGS. 2A-B) that allow the toes to attach independently to objects with a minimum radius of curvature of 5 centimeters. The toes can also peel backward in a motion approximating the digital hyperextension that geckos use to detach their feet with very little force.

Figure 3A:
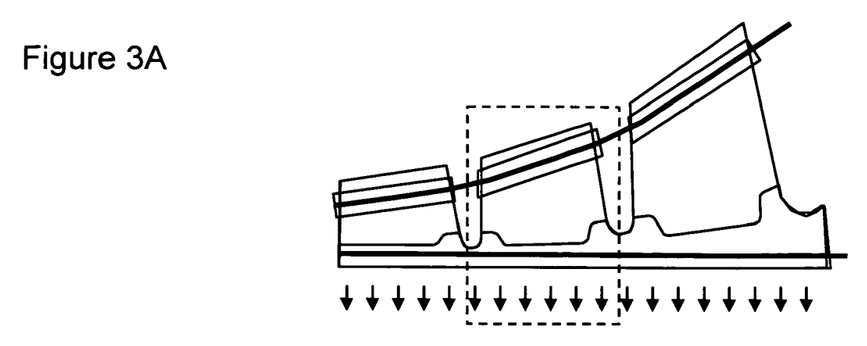
FIG. 3A shows a three-dimensional schematic of a toe and FIG. 3B s
Figure 3B:
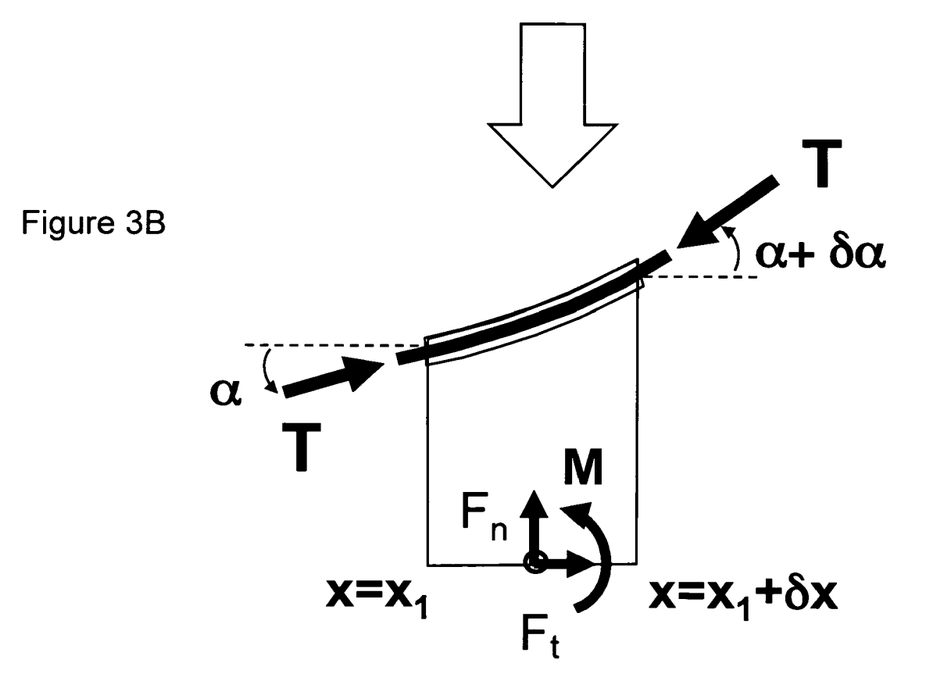

Assuming an approximately uniform toe width, the toe's cable profile is calculated to achieve a uniform stress distribution when the toes are deployed on flat surfaces (FIGS. 3A-B). The sum of the forces in the y direction is given as:

$$T \sin\theta - T\sin(\theta+\delta\theta) + F_n = 0 \quad (1)$$

where T is the force acting along the cable, θ is the angle of the cable with respect to the horizontal, and $F_n$ is the normal force acting on the bottom of the toe. To ensure uniform attachment of the foot, a constant pressure on the bottom of the toe is desired:

$$\frac{T(\sin(\theta+d\theta) - \sin\theta)}{dx} = \frac{F_n}{d_x} = \sigma \quad (2)$$

Expanding the term $\sin(\theta+d\theta)$ and assuming that dθ is small such that $\cos d\theta = 1$ and $\sin d\theta = d\theta$ yields:

$$\cos\theta d\theta = \frac{\sigma}{T} dx \quad (3)$$

Integrating both sides and solving for θ gives:

$$\theta = \arcsin\left(\frac{\sigma x}{T}\right) \quad (4)$$

The slope of the cable profile is thus:

$$\frac{dy}{dx} = \tan\left(\arcsin\left(\frac{\sigma x}{T}\right)\right) \quad (5)$$

Integrating with respect to x yields the profile of the cable:

$$y(x) = -\frac{T}{\sigma}\sqrt{1 - \left(\frac{\sigma x}{T}\right)^2} \quad (6)$$

which is simply a circular arc with radius $T/\sigma$.

Figure 4:
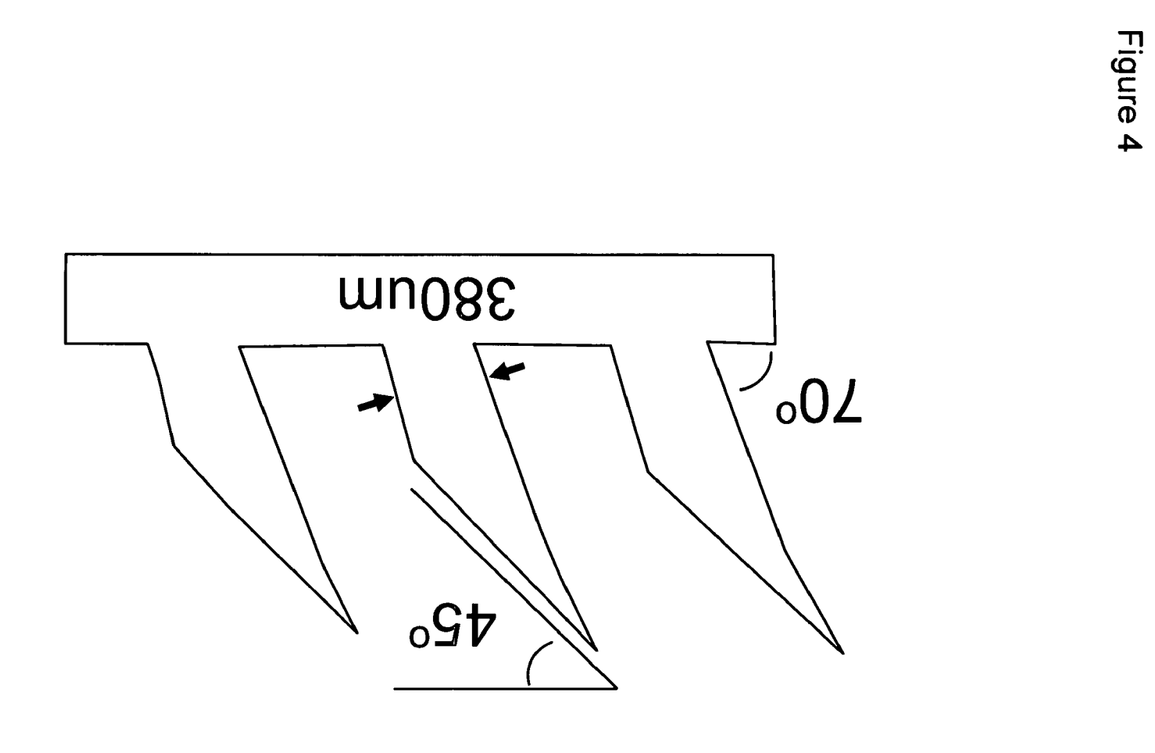
FIG. 4 shows according to the present invention anisotropic hair features made of 20 Shore-A polyurethane. The hair features in this example measure 380 micrometers in diameter at the base. The base angle (acute angle) is about 70 degrees and the tip angle is about 45 degrees in this example. The length of the hair features is typically larger than 500 micrometers, and the hairs have a diameter/length ratio of between 1/3 and 1/4.

At the finest scale, the contact surfaces of the feet are equipped with synthetic adhesive materials (FIGS. 1A-B). To date, the best results have been obtained with arrays of small, asymmetric elastomeric features as shown in FIG. 4. The arrays were made by micromolding with a soft (Shore 20-A) urethane polymer. This structure allows anisotropic compliance that is essential for the directional adhesive behavior addressed in following section.

Anisotropic Friction and Adhesion

Figure 5:
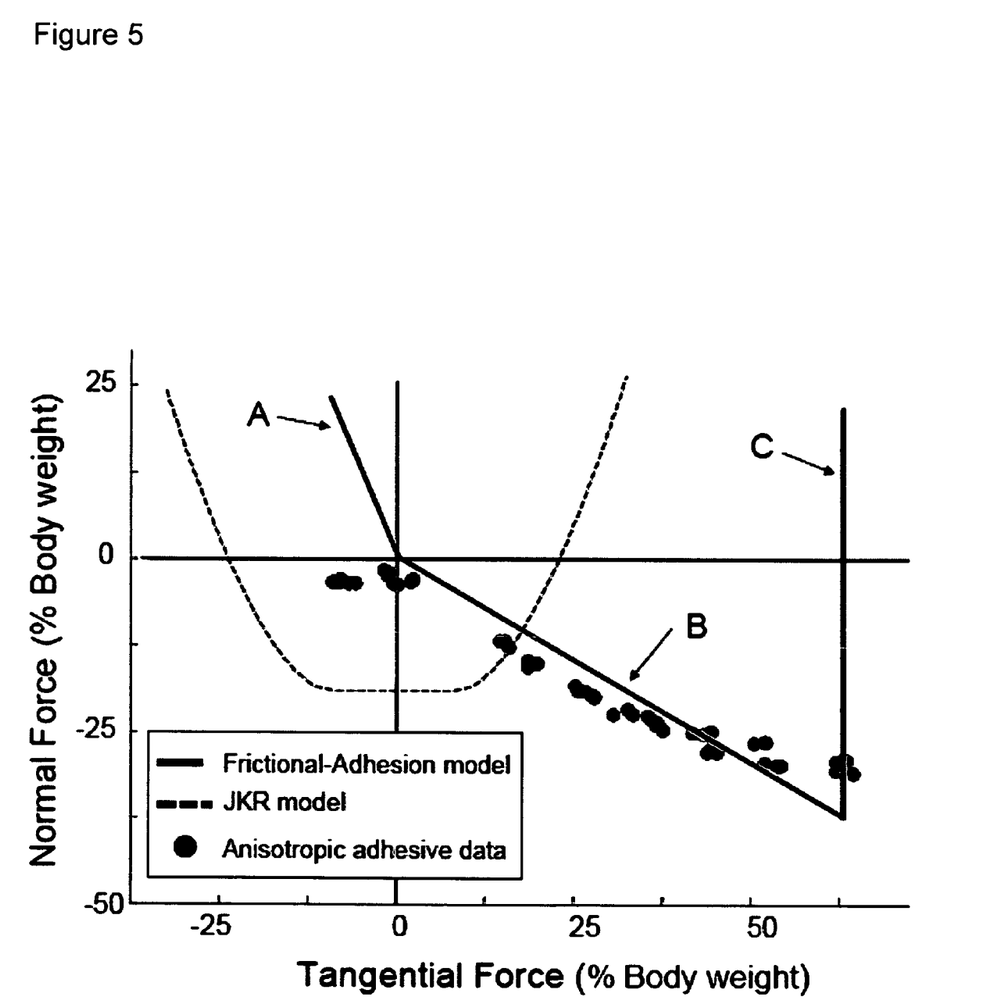

As mentioned in the previous section, geckos can achieve levels of adhesion of over 500 KPa over areas of several square millimeters. However, adhesion only occurs if the lamellae and setae are loaded in the proper direction (inward from the distal toward the proximal region of the toes). As the setae first contact the surface there is a transient positive normal force due to their elasticity. Shortly thereafter, the tips of the setae grab the surface and the normal force becomes tensile. The maximum pull-off force is related directly to the amount of tangential force present. Conversely, if the toes are brought into contact while moving from the proximal toward the tip regions (i.e., pushing along the toes rather than pulling) no adhesion is observed and the tangential force is limited by a coefficient of friction. The tangential and normal forces contact limits can be modeled as:

$$F_N \geq -\frac{1}{\mu} F_T \quad \begin{cases} F_T < 0 \\ 0 \leq F_T \leq F_{max} \end{cases} \quad (7)$$
$$F_N \geq -\tan(\alpha*) F_T$$

where $\alpha^*$ is the critical peel angle, $\mu$ is the coefficient of friction, $F_T$ is tangential (shear) load, taken positive when pulling inward, and $F_N$ is the normal force, taken positive when compressive. The limit, $F_{max}$, is a function of the maximum shear load that the gecko or robot can apply, the material strength, and the shear strength of the contact interface. Thus, the adhesion increases proportionally with the applied tangential force. This feature, coupled with the gecko's hierarchical compliance, allows it to adhere to surfaces without applying a significant preload. This is beneficial since any preload can cause a gecko (or robot) to push itself away from the wall. Additionally, by decreasing the shear load, the gecko is able to release its foot from the wall gracefully, with zero normal force. FIG. 5 illustrates the directional adhesion model in comparison to the commonly used isotropic Johnson-Kendall-Roberts (JKR) model for elastomers. In contrast to the frictional adhesion model, the JKR model's limit surface does not intersect the origin. Instead, the maximum adhesion force is obtained when there is zero shear force, which is much less useful for climbing on vertical surfaces. Moreover, detachment requires a high normal force unless a high tangential force is also present.

Stickybot's anisotropic adhesive patches approximately follow the frictional-adhesion model as shown by data in FIG. 5. Evidence of low preload and detachment forces is presented in the Results section. Early versions of Stickybot used isotropic adhesive patches comprised of polyurethane (Innovative Polymers Shore 20A) or Sorbothane. The large detachment forces caused undesirable force transients to propagate throughout the body and prematurely detach the other feet. Reliable climbing was not obtained until the anisotropic features were added. The anistropic patches also work in conjunction with Stickybot's underactuated limbs: because the patches essentially self-adhere when they are pulled in shear, the toes automatically align themselves to surfaces to maximize the contact area.

Distributed Force Control

Distributed force control ensures that stresses are uniformly distributed over the toes and that undesirable force transients and accompanying oscillations are avoided. At the toe level, embedded flexible but inextensible fabric (FIG. 1B) allows the feet to obtain a more uniform shear loading over the toes. Together, the fabric and the cable "tendons" provide a load path that routes tangential forces from the toes to the ankles without producing undesired bending moments or stretching that would cause crack propagation and premature peeling at one edge of a toe. At the foot level, ankle compliance and a two stage differential mechanism balance normal forces among toes. At the body level, Stickybot utilizes force control to manage the tangential forces at the feet. This allows Stickybot to maintain dynamic equilibrium as well as increase or decrease the allowable adhesion force.

Unlike a walking or running quadruped, a climbing quadruped must pay continuous attention to the control of internal forces whenever feet are in contact with the climbing surface. Also, it is important to unload feet in the tangential direction (to relax any built-up forces and accompanying elastic deflections) immediately before lift-off so as to prevent transient forces and associated oscillations that could cause other feet to lose their grip. In geckos, it has been observed that there are virtually no noticeable transient forces as feet make and break contact. Attachment and liftoff are smooth, low-force events. In Stickybot, as in geckos, the combination of toe peeling (digital hyperextension) and directional adhesion are used to minimize detachment forces.

To achieve smooth engagement and disengagement and control its internal forces, Stickybot uses force feedback coupled with a stiffness controller. Stickybot has force sensors located on its shoulder joints that measure the deflection of an elastomeric spring via a ratiometric Hall effect sensor (Honeywell: SS495A). In addition to providing an estimate of the force, the compliance helps to distribute forces among the limbs such that excessive internal forces do not occur and lead to contact failure.

Stickybot is controlled using a single master microcontroller (PIC18F4520) connected to four slave microcontrollers (PIC12F683) using an I2C bus. The master microcontroller produces twelve pulse-width-modulation signals to control each servo separately. Each slave microcontroller reads and digitizes data from the force sensors and transmits it to the master microcontroller.

Stickybot's controller must consider limb coordination, which presents two different and sometimes contradictory goals: force balancing and leg phasing. In addition, certain stable limb combinations must be in contact with the climbing surface at all times (i.e., Stickybot must use either a diagonal trot or tripedal crawl). To achieve this, three separate control laws for four different stages of leg motion (stance, detachment, flight, attachment) are implemented.

1) Stance Controller: During stance, the controller implements force balancing using a grasp-space stiffness controller. Since in this example of Stickybot servomotors are used that only accept position commands, the stiffness control law is given as:

$$x_{cmd}(s) = x_{ff}(s) + \left(k_P + \frac{k_I}{s}\right) C(f_s(s) - f_d(s)) \quad (8)$$

where $x_{cmd}$ is a vector comprised of the stroke servo commanded positions, $x_{ff}$ is the feed forward position command, $k_P$ and $k_I$ are the proportional and integral gains respectively, C is the compliance matrix, $f_s$ is a vector comprised of sensed traction forces from each leg, and $f_d$ is a vector of desired traction forces. While a diagonal compliance matrix would result in independent leg control, during stance C is defined as:

$$C = G^{-1} C_0 G \quad (9)$$

where $C_0$ is a diagonal gain matrix chosen such that $C_0 \neq I$ and G is the grasp matrix given as:

$$G = \frac{1}{2}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (10)$$

Figure 6:
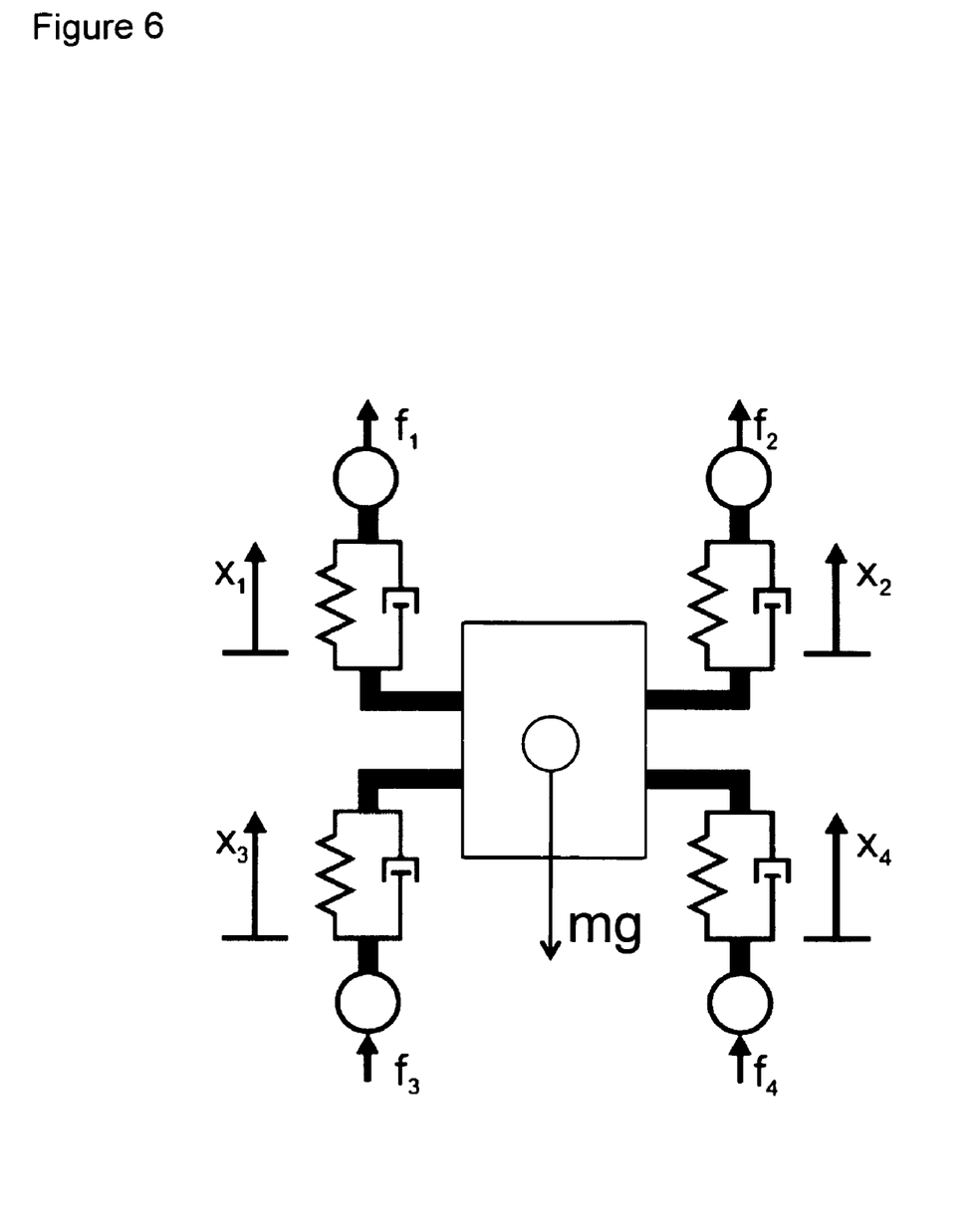
FIG. 6 shows according to the present invention a schematic used to generate values for the grasp matrix.

The grasp matrix is comprised of four independent "grasp modes." The first row in G is formed by summing the grasp forces in tangential direction (i.e. parallel to the toes) (FIG. 6). The second row is produced by summing the moments about the center of mass. The third and fourth rows are chosen such that G is orthogonal. The chosen values correspond to a fore-aft coupling and a diagonal coupling of the legs respectively. The implementation of stiffness control in grasp space creates a framework for force distribution. By increasing the compliances of all but the total-traction mode, the robot will evenly distribute the forces between feet and achieve force balance while remaining stiff to other variations in loading.

2) Attachment and Detachment Controller: This controller is identical to the stance controller except that C=I, which allows each leg to act independently.

3) Flight Controller: During flight, the controller performs phase adjustments, which effectively keeps the legs close to a predefined gait. The flight controller is defined as:

$$x_{cmd\_j}(s) = \frac{v_{ff}}{s} + k\left(\phi_i - \frac{\phi_{i+1} + \phi_{i-1}}{2}\right) \quad (11)$$

where $v_{ff}$ is a feed forward velocity, k is a proportional gain, $\phi_i$ is the phase angle along a nominal leg trajectory, $\phi \in [0,1]$, and i is the leg detachment order, i=1 . . . 4.

Results

Stickybot is capable of climbing a variety of surfaces at 90 degrees including glass, glossy ceramic tile, acrylic, and polished granite at speeds up to 4.0 cm/s (0.12 body-lengths/s, excluding the tail). The maximum speed of Stickybot on level ground is 24 cm/s and is limited by the speed of its actuators (Table I).

TABLE I

| Physical parameters for Stickybot. | |
|---|---|
| Body size | 600 × 200 × 60 mm (excluding cables) |
| Body mass | 370 g (including batteries and servo circuitry) |
| Maximum speed | 4.0 cm/s (0.05 bodylength/s) |
| Servo motors | Hitec HB65 × 8 Hs81 × 4 |
| Batteries | Lithium polymer × 2 (3.7 V, 480 mAh per pack) |

Figure 7:
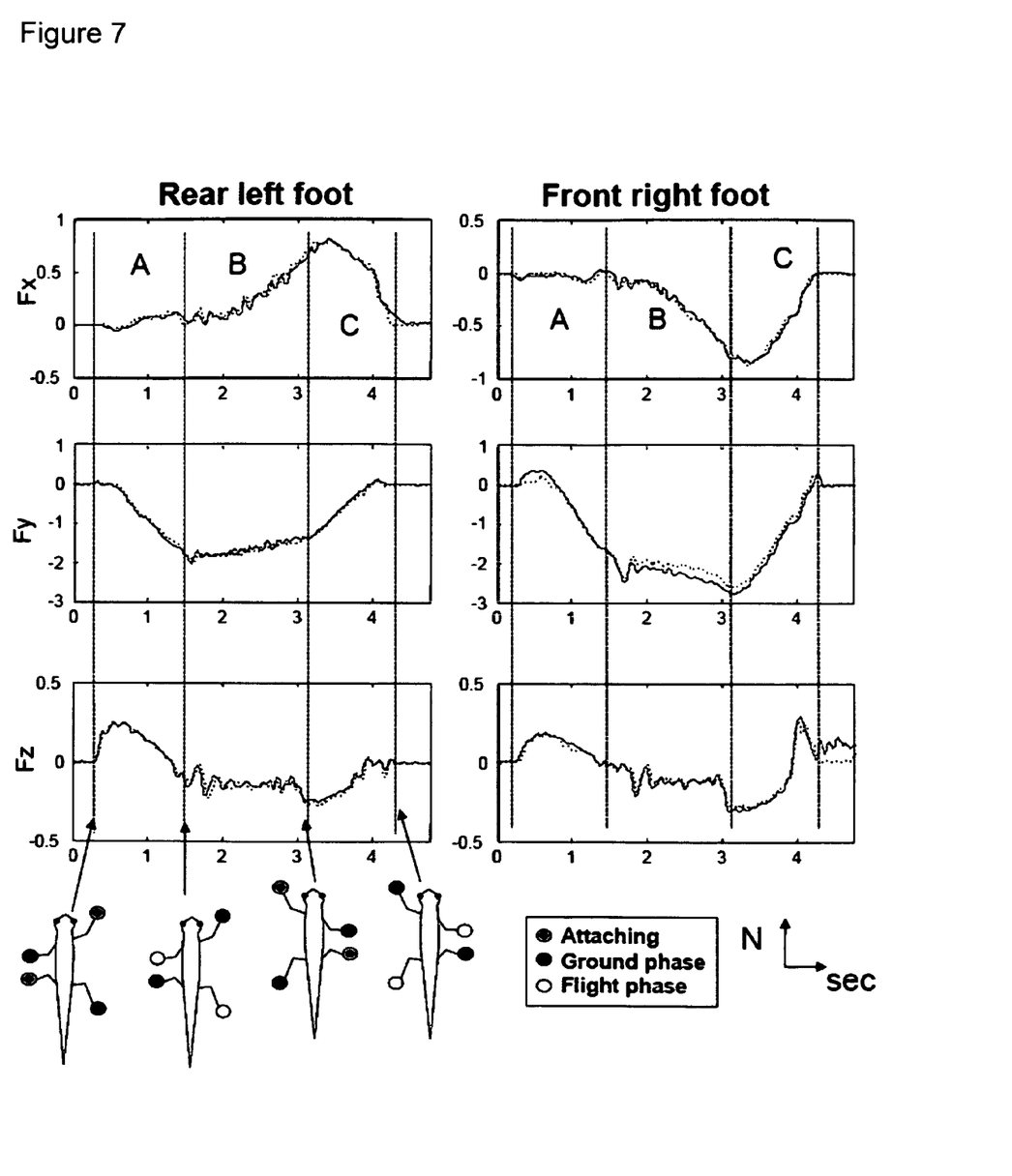
FIG. 7 shows according to the present invention force plate data of rear left foot (left) and front right foot (right) of Stickybot climbing with a 6 second period at a speed of 1.5 cm/s (data were filtered at 10 Hz). Two successive runs (solid and dotted lines) are shown to illustrate repeatability.

FIG. 7 presents force plate data of Stickybot climbing vertical glass. The left side shows data from the rear left foot and the right side displays data from the front right foot. Forces are in N and time in seconds. Data from two successive runs are shown to give an indication of the typical repeatability.

Section A (0 to 1.5 seconds) represents the preloading and flexing of the foot. There is almost no force in the lateral (X) direction during preload. The traction force (-Y) is increasing.

Although each foot would ideally engage with negligible normal force, there is a small amount of positive normal force during engagement. Weight transfer between diagonal pairs also occurs during section A.

Section B represents the ground stroke phase. There are equal and opposite forces in the X direction for the front right and rear left feet, indicating that the legs are pulling in toward the body. This helps stabilize the body and is similar to the lateral forces exhibited in geckos (and in contrast to the outward lateral forces observed in small running animals such as lizards and insects). The Y direction shows relatively steady traction force, and the Z-direction indicates adhesion on both the front and rear feet. Note that this differs from gecko data, in which the rear feet exhibit positive normal force. This is due to the fact that Stickybot uses its tail to prevent the body from pitching back, and geckos use their rear feet.

In section C Stickybot releases the feet both by reducing the traction force (Y) and by peeling (utilizing digital hyperextension). Both the front and rear feet exhibit low detachment forces in the Z-direction, especially the rear foot. We note also that the transition between B and C is accompanied by a temporary increase in adhesion (-Z force) and subsequent decrease as the opposite diagonal feet come into engagement.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example:

The elastomer for the adhesive hairs could be a silicone rubber instead of polyurethane.

The cable that actuates the toes could be a synthetic cable, carbon graphic cable or a single or multi-strand cable.

The feature size of the hairs could be reduced from a diameter of 380 micrometers, while preserving the diameter/length ratio of between 1/3 and 1/4 and preserving the base angle (acute angle) and tip angle as described in FIG. 4.

The material for the backing layer and segments could be a polyurethane, whereby the backing layer material is softer compared to the material of the segments. Other materials that could be used are e.g. materials with a high strength castable resin.

The invention could be a device or a system useful in non-robotic applications such as hanging or suspending objects on inclined, vertical or non-horizontal surfaces.

All such variations are considered to be within the scope and spirit of the present invention as defined by the following claims and their legal equivalents.

What is claimed is:

1. A device for directional and distributed control of adhesive forces, comprising:
   (a) a plurality of parallel anisotropic hair features making an acute angle with respect to a reference plane to define a hair direction, wherein each of said plurality of parallel anisotropic hair features further comprises a tip angle with respect to said reference plane and with the hair tip tapered asymmetrically and in the direction of said hair direction;
   (b) a backing layer with embedded therein a flexible and inextensible fiber, said backing layer affixed to said plurality of parallel anisotropic hair features; and
   (c) a plurality of segments affixed to said backing layer on the side of said backing layer opposite to said plurality of anisotropic hair features, wherein the segment thickness increases height in a direction opposite to said hair direction, and wherein said backing layer hinges at gaps between said plurality of segments.

2. The device as set forth in claim 1, wherein the thickness of said backing layer increases height in a direction opposite to said hair direction.

3. The device as set forth in claim 1, further comprising a cable through and near the surface of said plurality of segments.

4. The device as set forth in claim 3, further comprising a push-pull actuator to push-pull said cable.

5. The device as set forth in claim 1, wherein the material of said backing layer is softer than the material of said plurality of segments.

6. The device as set forth in claim 1, wherein said acute angle is larger than 45 degrees and smaller than 90 degrees.

7. The device as set forth in claim 1, wherein said flexible and inextensible fiber is a fiber mesh, a fabric, a synthetic fiber or a synthetic cloth fiber.

8. The device as set forth in claim 1, wherein said device is a hanging device, a picture hanger, a suspension mechanism, a finger, a robot finger, a toe or a robot toe.

9. A robotic device, comprising:
   (a) a set of limbs, wherein each limb having a set of toes, wherein each of said toes comprises:
      (i) a plurality of parallel anisotropic hair features making an acute angle with respect to a reference plane to define a hair direction, wherein each of said plurality of parallel anisotropic hair features further comprises a tip angle with respect to said reference plane,
      (ii) a backing layer with embedded therein a flexible and inextensible fiber, said backing layer affixed to said plurality of parallel anisotropic hair features,
      (iii) a plurality of segments affixed to said backing layer on the side of said backing layer opposite to said plurality of anisotropic hair features, and
      (iv) a cable through and near the surface of said plurality of segments; and
   (b) an actuator to control said cables of said toes.

10. The robotic device as set forth in claim 9, wherein the thickness of said backing layer of each of said toes increases height in a direction opposite to said hair direction.

11. The robotic device as set forth in claim 9, wherein the segment thickness increases height in a direction opposite to said hair direction.

12. The robotic device as set forth in claim 9, wherein said backing layer hinges at gaps between said plurality of segments.

13. The robotic device as set forth in claim 9, wherein the material of said backing layer is softer than the material of said plurality of segments.

14. The robotic device as set forth in claim 9, wherein said acute angle is larger than 45 degrees and smaller than 90 degrees.

15. A device for directional and distributed control of adhesive forces, comprising:
   (a) a plurality of parallel anisotropic hair features making an acute angle with respect to a reference plane to define a hair direction;
   (b) a backing layer with embedded therein a flexible and inextensible fiber, said backing layer affixed to said plurality of parallel anisotropic hair features;
   (c) a plurality of segments affixed to said backing layer on the side of said backing layer opposite to said plurality of anisotropic hair features, and wherein the segment thickness increases height in a direction opposite to said hair direction.
   (d) a cable through and near the surface of said plurality of segments; and
   (e) a push-pull actuator to push-pull said cable.

16. The device as set forth in claim 15, wherein the thickness of said backing layer increases height in a direction opposite to said hair direction.

17. The device as set forth in claim 15, wherein said backing layer hinges at gaps between said plurality of segments.

18. The device as set forth in claim 15, wherein the material of said backing layer is softer than the material of said plurality of segments.

19. The device as set forth in claim 15, wherein said acute angle is larger than 45 degrees and smaller than 90 degrees.

20. The device as set forth in claim 15, wherein each of said plurality of parallel anisotropic hair features further comprises a tip angle with respect to said reference plane and with the hair tip tapered asymmetrically and in the direction of said hair direction.

21. The device as set forth in claim 20, wherein said tip angle is larger than 0 degrees and smaller than said acute angle.

22. The device as set forth in claim 15, wherein said flexible and inextensible fiber is a fiber mesh, a fabric, a synthetic fiber or a synthetic cloth fiber.

23. The device as set forth in claim 15, wherein said device is a hanging device, a picture hanger, a suspension mechanism, a finger, a robot finger, a toe or a robot toe.

24. A robotic device, comprising:
   (a) a set of limbs, wherein each limb having a set of toes, wherein each of said toes comprises:

(i) a plurality of parallel anisotropic hair features making an acute angle with respect to a reference plane to define a hair direction,
(ii) a backing layer with embedded therein a flexible and inextensible fiber, said backing layer affixed to said plurality of parallel anisotropic hair features,
(iii) a plurality of segments affixed to said backing layer on the side of said backing layer opposite to said plurality of anisotropic hair features, and
(iiii) a cable through and near the surface of said plurality of segments; and (b) an actuator to control said cables of said toes.

25. The robotic device as set forth in claim 24, wherein the thickness of said backing layer of each of said toes increases height in a direction opposite to said hair direction.

26. The robotic device as set forth in claim 25, wherein the segment thickness increases height in a direction opposite to said hair direction.

27. The robotic device as set forth in claim 25, wherein said backing layer hinges at gaps between said plurality of segments.

28. The robotic device as set forth in claim 25, wherein the material of said backing layer is softer than the material of said plurality of segments.

29. The robotic device as set forth in claim 25, wherein each of said plurality of parallel anisotropic hair features further comprises a tip angle with respect to said reference plane and with the tip tapered asymmetrically and in the direction of said hair direction.

30. The robotic device as set forth in claim 29, wherein said tip angle is larger than 0 degrees and smaller than said acute angle.

31. The robotic device as set forth in claim 25, wherein said acute angle is larger than 45 degrees and smaller than 90 degrees.

* * * * *